US009245344B2

(12) United States Patent
Shim et al.

(10) Patent No.: US 9,245,344 B2
(45) Date of Patent: Jan. 26, 2016

(54) METHOD AND APPARATUS FOR ACQUIRING GEOMETRY OF SPECULAR OBJECT BASED ON DEPTH SENSOR

(71) Applicant: SAMSUNG ELECTRONICS CO., LTD., Suwon-si (KR)

(72) Inventors: Hyun Jung Shim, Seoul (KR); Seung Kyu Lee, Seoul (KR); Do Kyoon Kim, Seongnam-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 194 days.

(21) Appl. No.: 13/891,457

(22) Filed: May 10, 2013

(65) Prior Publication Data

US 2013/0301908 A1 Nov. 14, 2013

Related U.S. Application Data

(60) Provisional application No. 61/645,228, filed on May 10, 2012.

(30) Foreign Application Priority Data

Oct. 31, 2012 (KR) ........................ 10-2012-0122345

(51) Int. Cl.
*G06K 9/00* (2006.01)
*G06T 7/00* (2006.01)
*G06T 5/00* (2006.01)

(52) U.S. Cl.
CPC .............. *G06T 7/0065* (2013.01); *G06T 5/005* (2013.01); *G06T 2200/04* (2013.01); *G06T 2207/10028* (2013.01); *G06T 2207/10048* (2013.01)

(58) Field of Classification Search
USPC ......................................................... 382/189
See application file for complete search history.

(56) References Cited

U.S. PATENT DOCUMENTS

2004/0213443 A1 * 10/2004 Haussecker et al. .......... 382/128
2006/0210145 A1    9/2006 Lee et al.
(Continued)

FOREIGN PATENT DOCUMENTS

| CH | 1862969 A1 * | 12/2007 | ............. H04N 13/00 |
|---|---|---|---|
| EP | 1862969 A1 | 12/2007 | |
| JP | 2007-271373 | 10/2007 | |
| JP | 2012-78942 | 4/2012 | |
| KR | 10-2008-0079969 | 9/2008 | |
| KR | 10-2009-0052889 | 5/2009 | |
| KR | 10-2011-0134147 | 12/2011 | |

OTHER PUBLICATIONS

Maimone et al. "Encumbrance-free telepresence system with real-time 3D capture and display using commodity depth cameras." IEEE International Symposium on Mixed and Augmented Reality, Science and Technology Proceedings. Oct. 2011.*

(Continued)

*Primary Examiner* — Gregory F Cunningham
(74) *Attorney, Agent, or Firm* — Harness, Dickey & Pierce, P.L.C.

(57) ABSTRACT

A method of acquiring geometry of a specular object is provided. Based on a single-view depth image, the method may include receiving an input of a depth image, estimating a missing depth value based on connectivity with a neighboring value in a local area of the depth image, and correcting the missing depth value. Based on a composite image, the method may include receiving an input of a composite image, calibrating the composite image, detecting an error area in the calibrated composite image, and correcting a missing depth value of the error area.

24 Claims, 14 Drawing Sheets

(56) References Cited

U.S. PATENT DOCUMENTS

2008/0036996 A1 2/2008 O'Connor et al.
2009/0315978 A1* 12/2009 Wurmlin et al. ............... 348/43
2011/0025827 A1* 2/2011 Shpunt et al. .................. 348/47
2011/0310376 A1* 12/2011 Shim et al. .................. 356/4.07

OTHER PUBLICATIONS

Cui et al. "3D shape scanning with a time-of-flight camera." IEEE Conference on Computer Visiona nd Pattern Recognition. Jun. 2010__.*

Euopean Search Report dated Nov. 12, 2015 for corresponding EP Application No. 13787830.2.*
International Search Report mailed on Sep. 6, 2013 in corresponding International Application No. PCT/KR2013/004008.
Maimone et al. "Encumbrance-free telepresence system with real-lime 3D capture and display using commodity depth cameras." IEEE International Symposium on Mixed and Augmented Reality, Science and Technology Proceedings. Oct. 2011.
Cui et al. "3D shape scanning with a time-of-flight camera." *IEEE Conference on Computer Visions nd Pattern Recognition.* Jun. 2010.

* cited by examiner

710

720

METHOD AND APPARATUS FOR ACQUIRING GEOMETRY OF SPECULAR OBJECT BASED ON DEPTH SENSOR

CROSS-REFERENCE TO RELATED APPLICATIONS

This application claims the priority benefit under 35 U.S.C. §119(e) of U.S. Provisional Application No. 61/645,228, filed on May 10, 2012, in the U.S. Patent and Trademark Office, and under 35 U.S.C. §119(a) of Korean Patent Application No. 10-2012-0122345, filed on Oct. 31, 2012, in the Korean Intellectual Property Office, the entire disclosures of each of which are hereby incorporated by reference.

BACKGROUND

1. Field

One or more example embodiments of the following disclosure relate to a method and apparatus for acquiring geometry of a specular object based on a depth sensor for various applications, for example, three-dimensional (3D) imaging, creation of contents for 3D displays, creation of 3D broadcast contents, animation effects, 3D games, and virtual or augmented reality.

2. Description of the Related Art

The development of various sensors has led to three-dimensional (3D) imaging technologies playing a vital role in the 3D imaging industry. With the recent introduction of new depth sensing methods and architectures, 3D imaging technologies are being used in various applications based on depth sensor developments.

As a result of these current trends, a 3D Time-of-Flight (ToF) sensor and a structured light 3D sensor are garnering attention in the market. These sensors have different characteristics and different advantages and disadvantages, and thus are used selectively depending on an application to be used.

SUMMARY

The foregoing and/or other aspects are achieved by providing a method of acquiring geometry of a specular object, the method including receiving an input of a composite image including at least one of a depth image and an infrared (IR) intensity image, calibrating the composite image, detecting an error area in the calibrated composite image, and correcting a missing depth value of the error area.

The correcting of the missing depth value of the error area may include separating a view-dependent pixel and a view-independent pixel from the composite image, and representing the composite image as a sum of the view-dependent pixel and the view-independent pixel, and applying different specular models to the view-dependent pixel and the view-independent pixel.

The calibrating of the composite image may include matching feature points extracted from a grid pattern.

The composite image may correspond to an image with M views, wherein M is a natural number greater than or equal to two, and the detecting of the error area in the calibrated composite image may include calculating a distribution of M number of depth values of a three-dimensional (3D) point in the composite image.

The calculating of the distribution of M number of depth values of the 3D point in the composite image may include calculating a distribution of M number of depth values observed from a neighboring 3D point of the 3D point.

The detecting of the error area in the calibrated may include image comprises detecting a 3D point in which multiple peaks are found in the distribution to be the error area.

The distribution may be calculated through a K-means clustering algorithm or Gaussian mixture model fitting, and the correcting of the missing depth value of the error area may include determining a main cluster from a plurality of clusters in the K-means clustering algorithm or the Gaussian mixture model fitting, determining a depth value of the 3D point using an arbitrary value, an average, a weighted sum, or a median of samples in the main cluster, and replacing the missing depth value with the determined depth value.

The determining of the main cluster from the plurality of clusters in the K-means clustering algorithm or the Gaussian mixture model fitting may include determining a cluster having a greatest number of samples inside and a smallest variation among the plurality of clusters to be the main cluster.

The foregoing and/or other aspects are also achieved by providing a method of acquiring geometry of a specular object, the method including receiving an input of a depth image, estimating a missing depth value based on connectivity with a neighboring value in the depth image, and correcting the missing depth value.

The depth image may include a local area defined to be an area where a point presenting the missing depth value is centered.

The depth image may correspond to a depth image having an output value of a saturation level.

The estimating of the missing depth value based on connectivity with the neighboring value in the depth image may include estimating the missing depth value for the missing depth value to ensure similarity to an average value of the local area.

The estimating of the missing depth value based on connectivity with the neighboring value in the depth image may include estimating the missing depth value for the missing depth value to ensure continuity with respect to a neighboring pixel.

The estimating of the missing depth value based on connectivity with the neighboring value in the depth image may include estimating the missing depth value for the missing depth value to ensure periodicity for a pattern in the depth image.

The estimating of the missing depth value based on connectivity with the neighboring value in the depth image may include estimating the missing depth value for the missing depth value to ensure similarity to an average value of the local area, continuity with respect to a neighboring pixel, and periodicity for a pattern in the depth image, and applying weight values to the similarity, the continuity, and the periodicity, and determining the missing depth value using a lowest total cost.

The foregoing and/or other aspects are also achieved by providing an apparatus for acquiring geometry of a specular object, the apparatus including a composite image input unit configured to receive an input of a composite image including at least one of a depth image and an IR intensity image, a composite image calibrating unit configured to calibrate the composite image, a composite image error detecting unit configured to detect an error area in the calibrated composite image, and a composite image correcting unit configured to correct a missing depth value of the error area.

The composite image may correspond to an image with M views, wherein M is a natural number greater than or equal to two, and the composite image error detecting unit may include a composite image distribution calculating unit configured to calculate a distribution of M number of depth values of a 3D point in the composite image and M number of depth values observed from a neighboring 3D point of the 3D point.

The composite image distribution calculating unit may be configured to calculate the distribution through a K-means clustering algorithm or Gaussian mixture model fitting, and the composite image correcting unit may include a main cluster determining unit configured to determine determining a cluster having a greatest number of samples inside and a smallest variation among the plurality of clusters to be a main cluster among a plurality of clusters in the K-means clustering algorithm or the Gaussian mixture model fitting, a composite value determining unit configured to determine a depth value of the 3D point using an arbitrary value, an average, a weighted sum, or a median of samples in the main cluster, and a composite value replacing unit configured to replace the missing depth value with the determined depth value.

The foregoing and/or other aspects are also achieved by providing an apparatus for acquiring geometry of a specular object, the apparatus including a single-view depth image input unit configured to receive an input of a depth image, a single-view depth value estimating unit configured to estimate a missing depth value based on connectivity with a neighboring value in a local area of the depth image, and a single-view depth value correcting unit configured to correct the missing depth value.

The single-view depth value estimating unit may be configured to estimate the missing depth value for the missing depth value to ensure similarity to an average value of the local area, continuity with respect to a neighboring pixel, and periodicity for a pattern in the depth image, and the apparatus may further include a single-view depth value determining unit configured to apply weight values to the similarity, the continuity, and the periodicity and to determine the missing depth value using a lowest total cost.

The foregoing and/or other aspects are also achieved by providing a 3D depth sensing camera. The camera includes a processor to control one or more processor-executable units, a depth value estimating unit to determine a depth value to be replaced in a depth image, and a depth value correcting unit to replace the depth value with a value obtained based on a neighboring depth value.

The foregoing and/or other aspects are also achieved by providing a method of acquiring geometry of a specular object. The method includes receiving an input of a composite image including at least one of a depth image and an infrared (IR) intensity image having multiple views, calibrating the composite image by matching feature points of the multiple views, detecting an error area in the calibrated composite image, correcting a missing depth value of the error area using a depth value obtained from a view of a point corresponding to the error area that is determined based on the calibrating of the composite image.

The foregoing and/or other aspects are also achieved by providing an apparatus reconstructing a depth value in a composite image. The apparatus includes a processor to control one or more processor-executable units, a composite image calibrating unit to calibrate the composite image, a composite image error detecting unit to detect a depth value to be replaced in a view based on the calibrating of the composite image, a composite image measuring unit to measure depth values of points, each point corresponding to the depth value to be replaced, in different views of the composite image, a composite image error correcting unit to correct the depth value to be replaced based on the depth values of the points measured by the composite image measuring unit.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

The conventional depth sensors described in the Background section above have limitations in obtaining a depth value of a specular object, for example, a shiny or reflective object. Such limitations are a result of excessively high or low intensity of a reflected signal sensed by the sensors because light is reflected from the object only in a predetermined direction according to characteristics of specular reflection. The depth sensors operate by way of sensing a reflected signal and estimating a depth value irrespective of an operating principle, and thus are incompatible for processing a depth value of a specular object.

Reference will now be made in detail to embodiments, of the present disclosure, which relate to a method and apparatus for acquiring geometry of a specular object based on a depth sensor for various applications, examples of which are illustrated in the accompanying drawings.

Figure 1A:
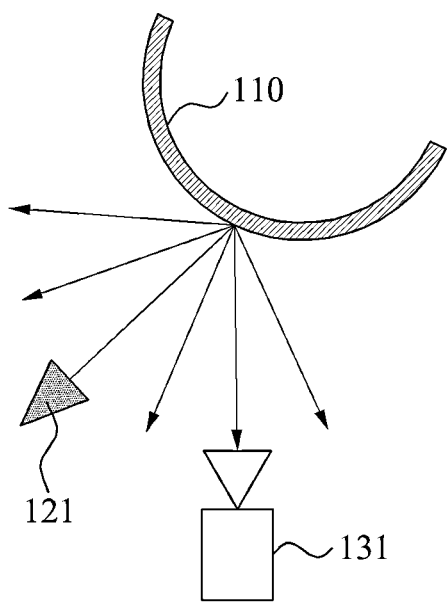
FIGS. 1A and 1B illustrate depth reconstruction for a Lambertian material.
Figure 1B:
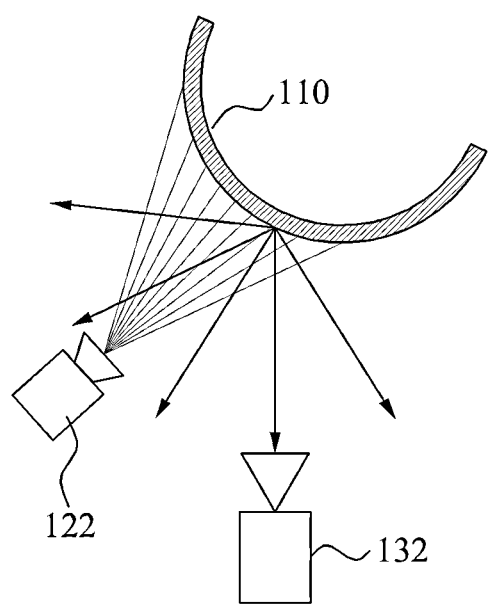

By way of explanation, FIGS. 1A and 1B illustrate depth reconstruction for a Lambertian material.

Existing commercial depth sensors are designed to operate under the assumption that an object has an ideal Lambertian surface. A Lambertian object reflects an incident light uniformly in all directions, with the light intensity being equal in all directions. Here, the depth sensor may include a depth camera.

Referring to FIG. 1A, according to a Time-of-Flight (ToF) principle, when light is emitted from an infrared (IR) illuminator 121, the emitted light is reflected from a reflecting surface of an object 110, and falls onto a sensor 131. A time taken for the reflected signal to return to the sensor 131 may be measured, and a distance may be calculated using the measured time. Here, the sensor may sense an equal amount of light irrespective of a location of the sensor because the object being sensed has a Lambertian surface that reflects light equally in all directions. Based on this principle, a depth value may be measured.

Referring to FIG. 1B, according to a structured light principle, when light patterns from a projector 122 are projected onto the object 110 and allocated to each surface point of the object 110, and a sensor 132 senses the characteristic patterns, an interaction between a straight line from the projector 122 to a surface point of the object 110 and a straight line from a center point of the sensor 132 to a pixel of the sensor 132 sensing the corresponding surface point may be calculated, and a three-dimensional (3D) position of the interaction may be derived. Accordingly, the sensor may detect the projected patterns because the object has a Lambertian surface that reflects light equally in all directions. Based on this principle, a depth value may be measured.

Figure 2A:
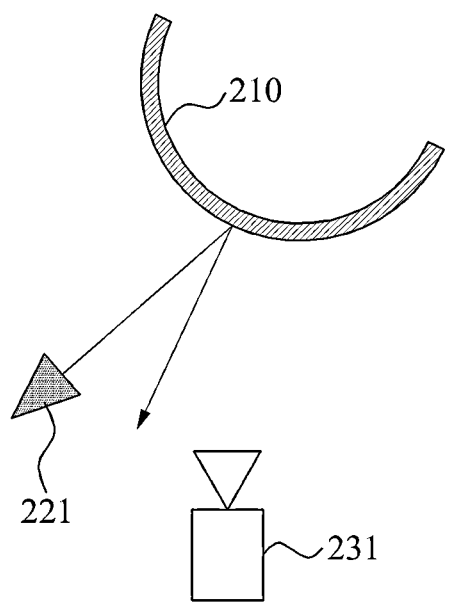
FIGS. 2A and 2B illustrate depth reconstruction for a specular material.
Figure 2B:
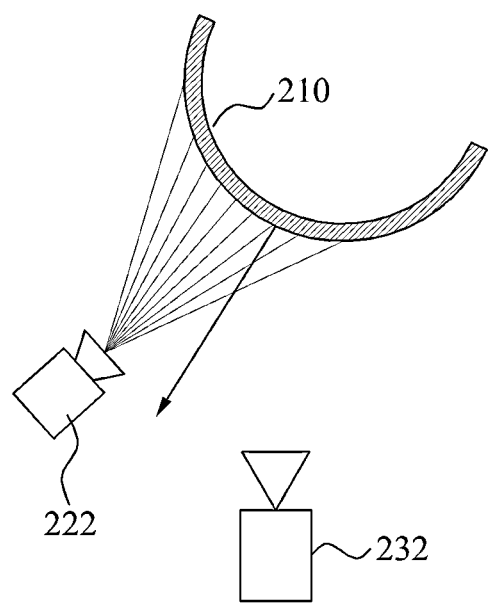

FIGS. 2A and 2B illustrate depth reconstruction for a specular material.

A specular material 210 having a surface exhibiting specular reflection, for example, a spherical mirror, may reflect light as shown in FIGS. 2A and 2B.

Referring to FIG. 2A, in a case of a ToF sensor 231, light emitted from an IR light emitting diode (LED) 221 is incident onto the object 210 and is reflected from the object 210 primarily in a predetermined direction, which is termed mirror reflection or specular reflection. When the sensor 231 is not located in the reflected direction, the sensor 231 may fail to sense light reflected from some surface points of the object 210, resulting in failure to measure a corresponding depth value. In contrast, although the reflected light may be sensed by the sensor 231 placed in the reflected direction, the light intensity sensed by the sensor 231 may exceed the capacity of the sensor 231. In this instance, saturation may occur in a sensed value. Thus, recovery of a depth value may fail due to the specular reflection of the object 210 as the sensor 231 fails to receive reflected light or when the light intensity sensed by the sensor 231 exceeds the capacity of the sensor 231. Such issues may also occur in a structured light sensor 232 of FIG. 2B, which is intended to receive light reflected from the object 210 onto which light from a projector 222 has been projected.

As described above, conventional commercial sensors have limitations in estimating a depth value of a specular object.

According to the example embodiments of the present disclosure, geometry of a highly reflective object may be reconstructed by recovering a depth value of the object accurately using depth image-based estimation on a single depth image or on a multi-view depth image, in an effort to overcome the sensing limitations of conventional commercial sensors. Here, the term "single depth image" may be used interchangeably with the term "single-view depth image".

In a single-view depth image, a missing depth value may be estimated based on continuity and repetition characteristics of a depth value. In a composite image, a missing depth value may be recovered accurately for each single view using a value measured in a neighboring-view depth image. The single-view depth image and the composite image may be measured using either ToF or structured light techniques. Here, the composite image may include either a depth image or an IR intensity image or both.

Accordingly, the sensing limitations of conventional commercial depth sensors may be overcome, enabling applications to various 3D imaging devices to contribute to acquisition and generation of 3D images. Moreover, creation of auto-stereoscopic 3D TV contents may also be enabled. An arbitrary scene may be reconstructed under various views and various conditions. Also, applications to augmented reality, in particular, a process of rendering, blending, or integrating a virtual object in a real image may be found to be useful.

Hereinafter, implementation in each of a single-view depth image and a composite image is described in further detail.

Figure 3:
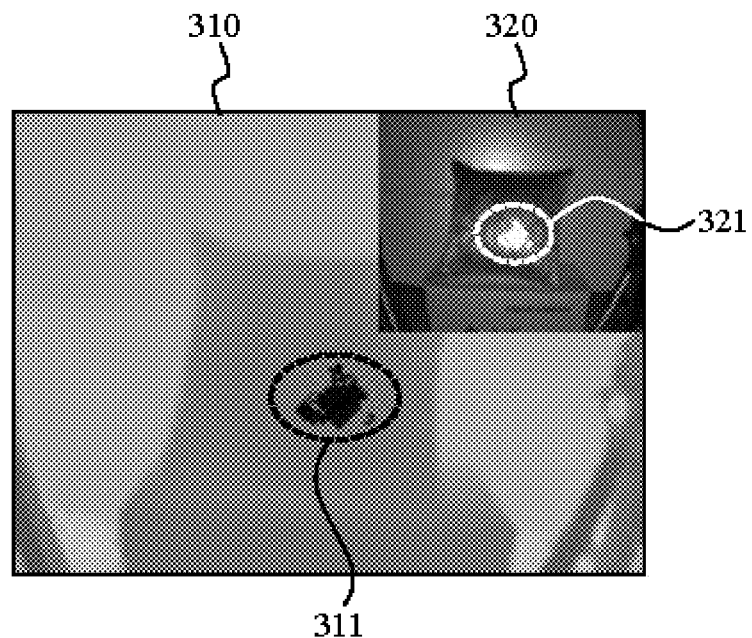
FIG. 3 is a grayscale image of a specular object using Time-of-Flight (ToF), along with a depth image.
Figure 4:
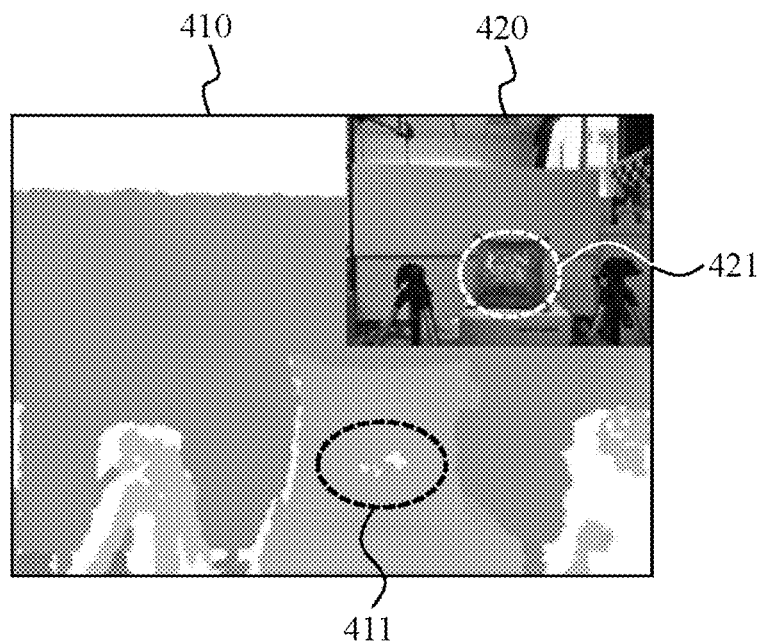
FIG. 4 is a color image of a specular object using structured light, along with a depth image.

FIG. 3 is a grayscale image 320 of a specular object using ToF, along with a depth image 310. FIG. 4 is a color image 420 of a specular object using structured light, along with a depth image 410. In FIGS. 3 and 4, the depth image 310 and the depth image 410 may express depths of the grayscale image 320 and the color image 420, respectively. A ToF camera may provide the grayscale image 320 and the depth image 310 concurrently. Also, a camera based on structured light may provide the color image 420 and the depth image 410 concurrently. According to an example embodiment, the grayscale image 320 may correspond to an IR intensity image.

The depth images 310 and 410 may have an output value of one or more depth values at a saturation level due to the specular reflection of the specular object. The output value of the depth value being at the saturation level may be caused by an absolute intensity value of light sensed by a sensor exceeding the capacity of the sensor. The sensor capacity may be exceeded when an IR point light or an IR structured light reflected from the object is received by the sensor in a single direction only or in primarily a single direction. This phenomenon may be similar to saturation occurring in a color image when subjected to excessive light from a solar light or an illuminator. Due to such a high reflection, regions 321 and 421 in the grayscale images 320 and the color image 420 may be displayed as being bright, and regions 311 and 411 in the depth images 310 and 410 corresponding to the regions 321 and 421 may be displayed as being dark as a result of the influence of saturation.

Figure 5A:
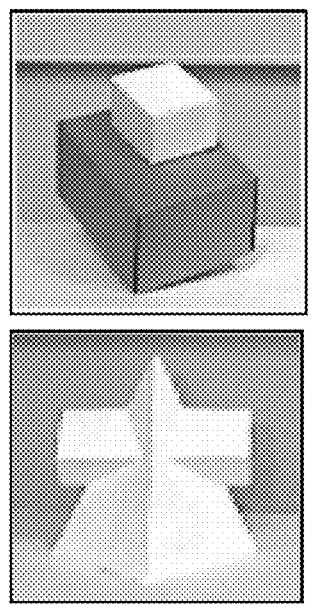
FIGS. 5A and 5B illustrate an orientation-induced error in a depth image of a specular object using ToF.
Figure 5B:
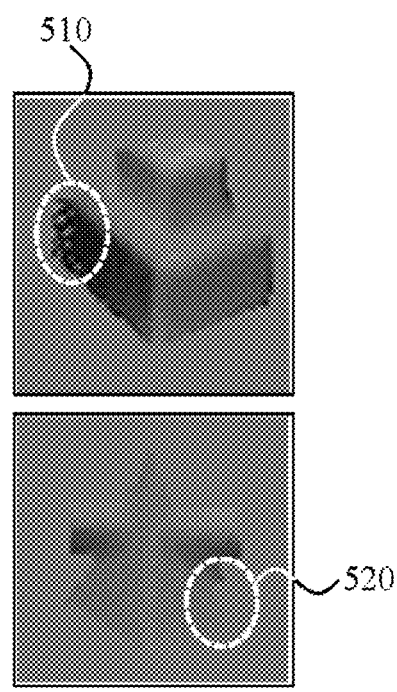

FIGS. 5A and 5B illustrate an error according to an orientation in a depth image of a specular object that is measured using ToF.

When ToF is used, a depth value may be derived by measuring a delay of a signal for an IR light incident on the object. An IR image may be output as a total of the delayed reflection values. In this instance, the IR image may not be used when deriving a depth value.

In the IR image, an error may occur due to orientation and may cause a depth value loss, for example, a region 510 appearing as a bright point and a region 520 in which a shape disappears. To overcome this orientation-induced error, a method according to an example embodiment is provided. A detailed description of overcoming orientation-induced errors is provided with reference to FIGS. 10 through 13.

Figure 6A:
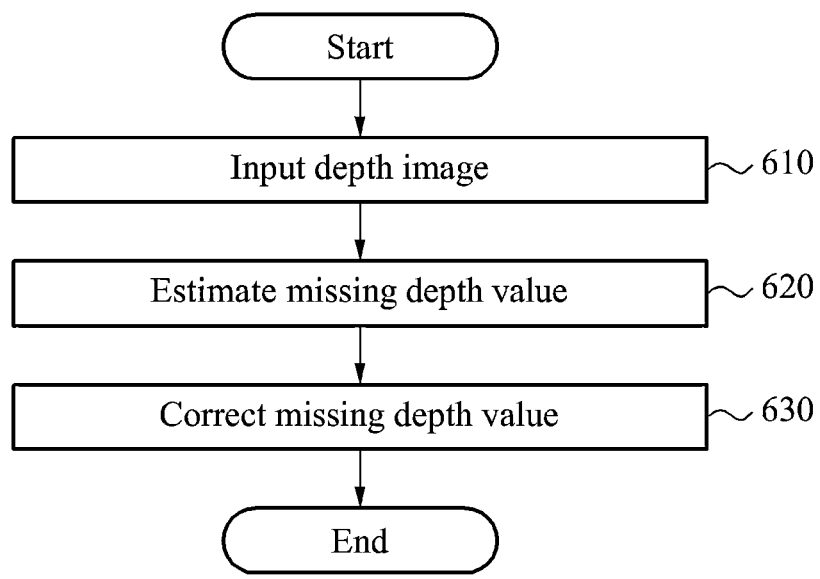
FIGS. 6A and 6B illustrate a method of acquiring geometry of a specular object based on a single-view depth image according to an example embodiment.
Figure 6B:
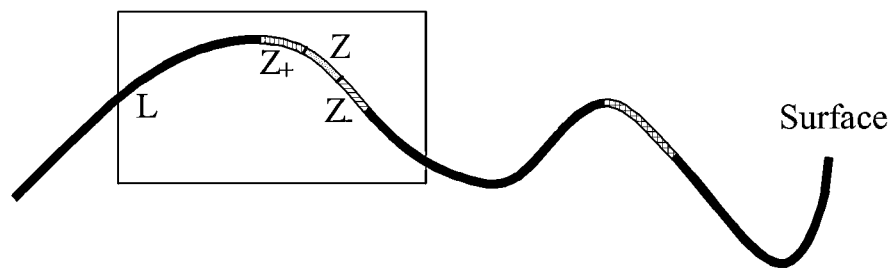

FIG. 6A is a flowchart illustrating a method of acquiring geometry of a specular object based on a single-view depth image according to an example embodiment. FIG. 6B illustrates cost function notation for depth value optimization according to an example embodiment.

In operation 610, a depth image may be input. According to an example embodiment, the depth image may correspond to an IR image obtained using a ToF technique.

In operation 620, a missing depth value may be estimated based on connectivity with a neighboring value in a local area of the depth image. The connectivity may include any one or more of a continuity, periodicity, and similarity. Additionally, a depth value that is inaccurate due to saturation of the sensor at the depth value may be estimated based on connectivity with a neighboring value in the depth image.

In operation 630, the inaccurate or missing depth value may be corrected. According to an example embodiment, the inaccurate or missing depth value may be corrected by replacing the missing depth value with the depth value estimated in operation 620.

According to an example embodiment, the missing depth value may be recovered by replacing the missing depth value with a depth value that allows maintenance of connectivity, for example, continuity, periodicity, and similarity, with respect to a neighboring depth value in the input depth image.

To estimate the missing depth value, cost functions defining similarity, continuity, such as similarity of surface change, and periodicity, for example, assuming that a depth value having a similar depth distribution is present in the depth image, may be defined. The cost functions may be represented by Equation 1.

$$E(Z, Z_s) = \underset{\hat{Z}}{\mathrm{argmin}} \alpha \left\| \frac{1}{N} \sum_{Z \in L} Z - \hat{Z} \right\|^2 + \beta \left\| \nabla(Z_+ - \hat{Z}) - \nabla(\hat{Z} - Z_-) \right\|^2 + \gamma \left\| \mathrm{var}[Z_- \hat{Z} Z_-] - \mathrm{var}(Z_s) \right\|^2$$ [Equation 1]

In Equation 1, $\hat{Z}$ denotes an estimated depth value. When L is a local area around a missing depth value, a total number N of depths in the local area may be set by quantizing the local area. The local area may correspond to a spatial box having a predetermined size, or may be set differently for each missing depth value based on a cue, for example, color on texture. Also, $Z_-$ and $Z_+$ denote neighboring depth values of the missing depth value to be recovered, and may refer to non-missing values. $Z_s$ denotes a patch or a segment having a continuous depth value, and may be optimized to a smallest value by comparing variation in patch or segment over the depth image.

A term, $$\left\| \frac{1}{N} \sum_{Z \in \Omega} Z - \hat{Z} \right\|^2$$

denotes similarity representing whether the depth value to be recovered is similar to an average of the local area. A term, $\|\nabla(Z_+ - \hat{Z}) - \nabla(\hat{Z} - Z_-)\|^2$ denotes continuity representing whether the depth value to be recovered maintains a continuous relationship with a neighboring pixel, and in another aspect, whether a surface curvature is maintained. A term, $\|\mathrm{var}[Z_+ \hat{Z} Z_-] - \mathrm{var}(Z_s)\|^2$ denotes periodicity representing whether a region exhibiting a similar pattern to that of the depth image is present, and may indicate the influence of the depth value to be recovered on distribution of the depth image.

For each term, a Z value for minimizing all the cost functions may be found by adjusting weight values α, β, and γ. Accordingly, a depth value may be optimized based on Equation 1. This process may be performed iteratively for each missing depth data to be recovered.

Figure 7A:
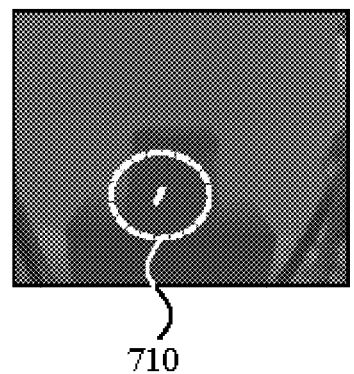
FIGS. 7A and 7B illustrate a geometry reconstructed result based on a single-view depth image according to an example embodiment.
Figure 7B:
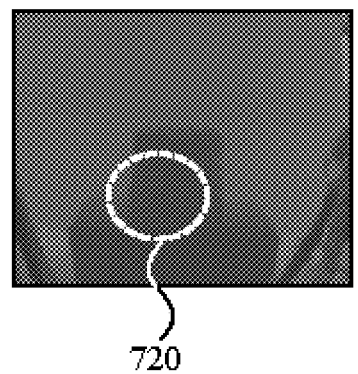

FIGS. 7A and 7B illustrate a geometry reconstructed result based on a single-view depth image according to an example embodiment.

FIG. 7A illustrates geometry of an opaque object exhibiting anisotropic reflection acquired using a traditional algorithm. The traditional geometry acquisition for a specular object is limited to an object exhibiting isotropic reflection. Due to the limitation, a region 710 having a missing depth value is displayed as being bright. Accordingly, a traditional algorithm has a limitation in acquiring geometry of an object having specularity with a consumer electronics (CE) instrument.

FIG. 7B illustrates a geometry reconstruction result based on a single-view depth image according to an example embodiment. Using the method of FIG. 6, a missing depth value displayed as an excessively bright region may be recovered by referring to a neighboring spatial pixel in the depth image. Accordingly, a corresponding region 720 may have a continuous depth value with respect to the neighbor, and may accurately represent the reconstructed geometry of the object.

Figure 8:
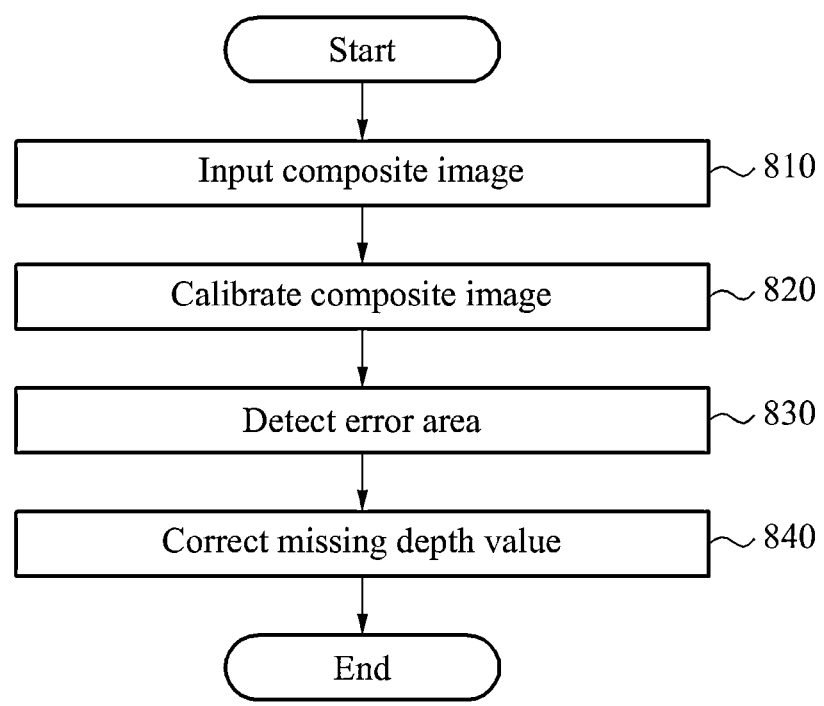
FIG. 8 is a flowchart illustrating a method of reconstructing geometry based on a composite image according to an example embodiment.

FIG. 8 is a flowchart illustrating a method of reconstructing geometry based on a composite image according to an example embodiment.

The depth value estimation based on a single-view depth image using one depth camera may be useful when a depth value is output as a meaningless value, for example, due to saturation. In contrast, the geometry reconstruction based on a multi-view depth image may compensate for a reduction in accuracy caused, for example, by noise as well as for a depth value loss caused by saturation.

According to an example embodiment, a method of acquiring geometry of a specular object in a composite image may include, as an example, composite image calibration, error area detection, and depth value correction. In an embodiment, the operations may occur in a sequential order. In another embodiment, the method of acquiring geometry of a specular object in a composite image may be applied to either of a single view or a multiview depth camera.

In operation 810, a composite image including at least one of a depth image and an IR intensity image may be input. According to an example embodiment, the composite image may correspond to a depth image with M views. In an embodiment, both the depth image and the IR intensity image may be used such as by using a set of IR intensity image pairs and depth image pairs, for example.

In operation 820, calibration of the composite image may be performed using camera calibration. The camera calibration may be performed by matching feature points extracted from a grid pattern. For example, openCV or Zhang's calibration toolbox may be applied.

When camera information is obtained by the calibration, composite image calibration may be implemented using the obtained camera information. A depth value measured from another view for the same 3D point may be calculated through image calibration. For example, when an image with M views is given, M number of depth values may be measured for each corresponding 3D point in each of the M views. In a case of a pure Lambertian object reflecting an IR light uniformly in all directions, an identical value will typically be measured for the same corresponding 3D point. In a case of a specular object reflecting light in a predetermined direction with no diffuse reflection, one or more of the M number of measured values may include a saturation value or a noise value as well as a meaningful depth value. For meaningful and accurate estimation of a depth value, each of the M number of samples may be analyzed. However, in an embodiment, some quantity less than the M number of samples may be analyzed while still obtaining an accurate depth value estimation.

In operation 830, an error area may be detected from the composite image. A distribution may be calculated, including M number of depth values of a 3D point and M number of depth values observed from a neighboring 3D point of the corresponding 3D point. In the depth distribution, a peak may be found at a predetermined value. To measure the peak, a K-means clustering algorithm or Gaussian mixture model fitting may be used. When multiple peaks are found in the distribution, a 3D point, in which the multiple peaks are found, may be detected to be an error area.

In operation 840, a missing or inaccurate depth value of the error area may be corrected. According to an example embodiment, a plurality of clusters may be determined, or a main cluster may be determined through Gaussian fitting. Of the plurality of clusters, a cluster having a great number of samples and a smallest variation in the cluster samples may be determined to be the main cluster. A depth value may be determined using an average or a non-linear weighted sum of samples in the determined cluster.

In order to enhance computational efficiency, only the depth values observed from M views for the corresponding 3D point may be used to determine the cluster, without using the neighboring points. Here, a median or an arbitrary value in the cluster may be used in lieu of the weighted sum or the average used to determine the cluster.

Figure 9:
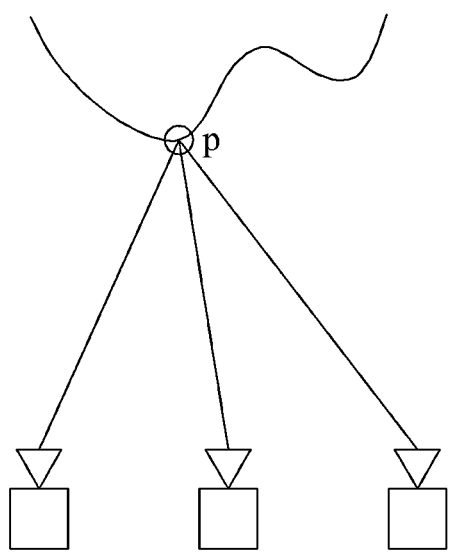
FIG. 9 illustrates a method of reconstructing geometry based on a multi-view composite image using a specular model according to an example embodiment.

FIG. 9 illustrates a method of reconstructing geometry based on a multi-view composite image using a specular model according to an example embodiment. A depth value may be determined by applying a specular model to an IR image provided using a ToF analysis. A function for determining the depth value may be represented by Equations 2 through 4.

$$I = I_{VD} + I_{VI} \quad \text{[Equation 2]}$$

$$I_{VI} = \rho_d n_p^T l \quad \text{[Equation 3]}$$

$$I_{VD} = \rho_s (r_p^T v)^\alpha \quad \text{[Equation 4]}$$

In Equations 2 through 4, I denotes intensity of an IR image, $I_{VI}$ denotes a view-independent pixel, and $I_{VD}$ denotes a view-dependent pixel. Also, p denotes a depth value, $\alpha$ denotes a surface roughness indicating that a relatively high value represents a smooth surface and a relatively low value represents a rough surface, $\rho_s$ denotes a view-dependent reflection constraint, for example, a specular reflection constraint, $\rho_d$ denotes a view-independent reflection constraint, for example, a diffuse reflection constraint. Here, $\alpha$ may be different from that of Equation 1.

As functions of an unknown variable 'p', '$n_p$' and '$r_p$' may denote a normal vector indicating orientation and a reflected vector indicating geometry when reflected, respectively. Here, 'p' may be identical to that of FIG. 9. According to an example embodiment, in a case of a ToF camera, 'l' may denote an illumination vector indicating a direction of light and 'v' may denote a view vector indicating a viewing direction in Equations 3 and 4. Since a location of radiated IR is given in the process of designing a ToF equipment and a depth value is calculated based on a location of a center of a camera sensor, values of 'l' and 'v' may be determined in advance in the course of a process. The values of 'l' and 'v' corresponding to direction vectors may be represented absent indicating in unit.

To apply the specular model to the IR image, the view-dependent pixel and the view-independent pixel may be separated from the multi-view IR image. The corresponding IR image may be represented as a sum of the view-dependent pixel and the view-independent pixel. The depth, orientation, intensity, and reflection constraints may be extracted using the multi-view IR image.

Figure 10:
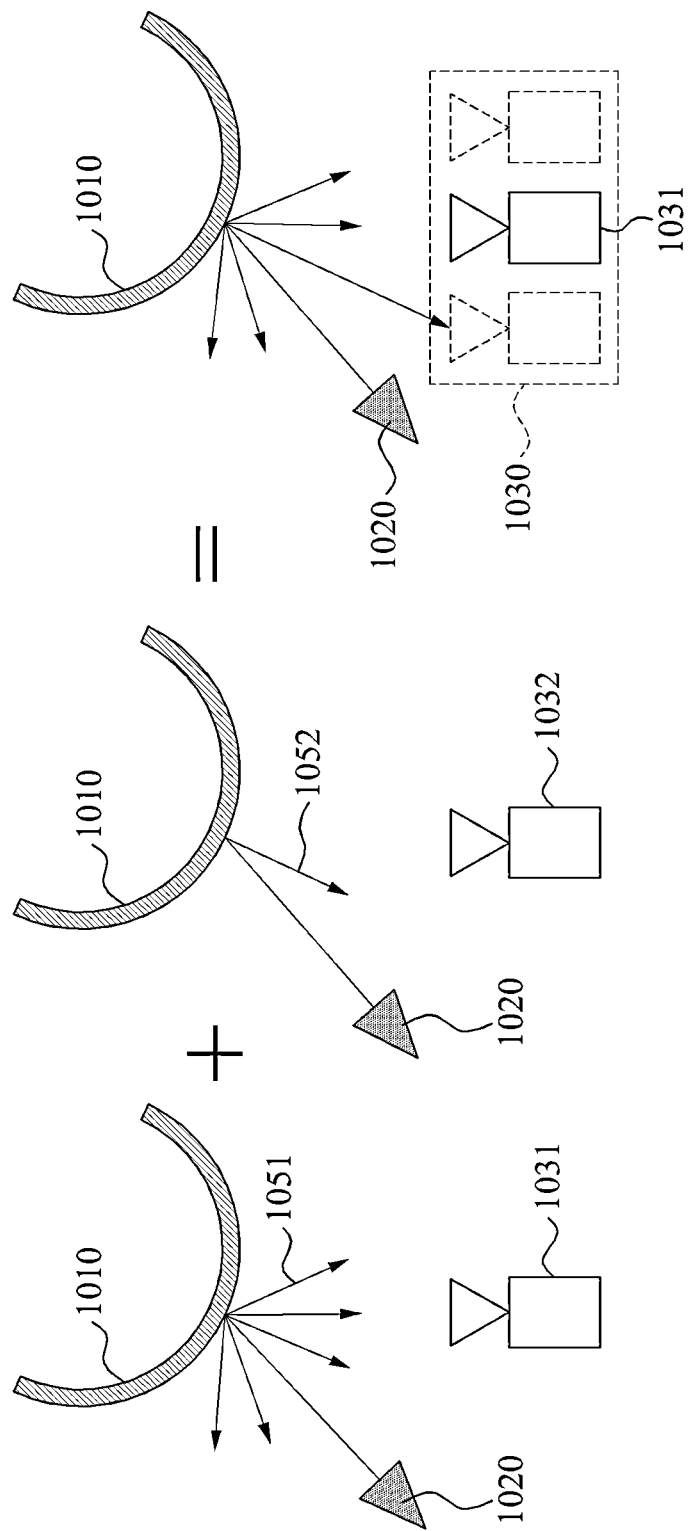
FIG. 10 illustrates separation of a view-dependent pixel from a multi-view composite image according to an example embodiment.
Figure 11:
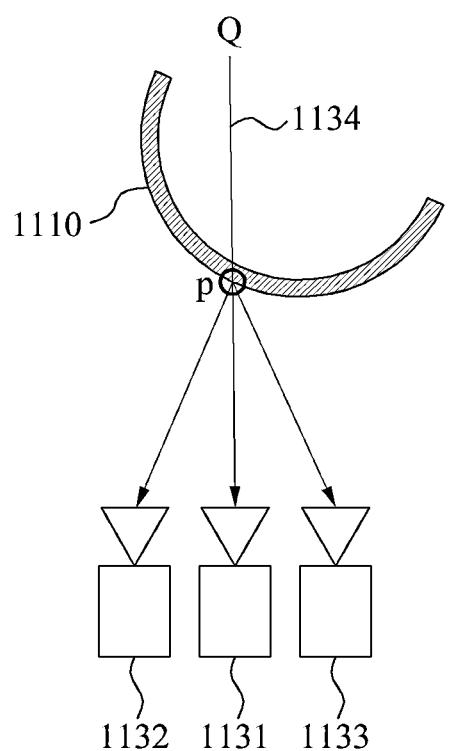
FIG. 11 illustrates application of different specular models to a view-dependent pixel and a view-independent pixel of a multi-view composite image according to an example embodiment.

A further description is provided with reference to FIGS. 10 and 11.

FIG. 10 illustrates separation of a view-dependent pixel from a multi-view composite image according to an example embodiment.

Referring to FIG. 10, in an IR image for a specular object 1010 reflecting light emitted from an IR LED 1020, a camera 1031 may measure a view-independent component $I_{VI}$ 1051, and a camera 1032 may measure a view-dependent component $I_{VD}$ 1052. The camera 1031 may extract a view-independent pixel from the view-independent component $I_{VI}$ 1051, and the camera 1032 may extract a view-dependent pixel from the view-dependent component $I_{VD}$ 1052. The view-independent pixel may be set to correspond to a value corresponding to a minimum value among values of an IR intensity image observed in a multi-view image, and the view-dependent pixel may be set to correspond to a remainder obtained by subtracting the value of the view-independent pixel from a corresponding pixel value. The IR image acquired from light collected by general specular reflection may be represented as a sum of the view-independent pixel and the view-dependent pixel. Since $I_{VI} + I_{VD} = I_{VI} + 0$, the camera 1031 measuring the view-independent component $I_{VI}$ 1051 may be only influenced by $I_{VI}$ 1051, and the camera 1032 measuring the view-dependent component $I_{VD}$ 1052 may be influenced by the view-independent component $I_{VI}$ 1051 and the view-dependent component $I_{VD}$ 1052.

FIG. 11 illustrates application of different specular models to a view-dependent pixel and a view-independent pixel of a multi-view composite image according to an example embodiment. According to an example embodiment, a Phong/TS model may be applied to a view-dependent pixel, and a Lambertian model may be applied to a view-independent pixel.

M number of depths and IR intensity may be measured. Depths observed from M views and an IR intensity value may be measured for each surface point 'p'. Here, 'p' may correspond to a point on a surface of a specular object 1110. The depths from M views and the IR intensity values may be measured by M number of sensors 1131, 1132, and 1133. Optimization may involve comparing a measured value and an estimated value. A model constraint may be calculated based on Equation 5.

$$[\rho_d, \rho_s, \alpha, p] = \operatorname*{argmin}_{\rho_d, \rho_s, \alpha, p} \sum_{m=1}^{M} \|I^m - \rho_d n_p^T l^m - \rho_s (r_p^T v^m)^\alpha\|^2 \quad \text{[Equation 5]}$$

$$\text{s.t. } p \subset Q$$

In Equation 5, $\|I^m - \rho_d n_p^T l^m - \rho_s (r_p^T v^m)^\alpha\|^2$ may denote comparison of a measured value to an estimated value. Using a depth value measured with initial value of 'p', depth, orientation, intensity, and reflection constraints may be extracted sequentially.

In FIG. 11, Q 1134 may denote a ray in which 'p' may be located, and p, α, $\rho_s$, $\rho_d$, 'l', $n_p$, $r_p$, 'l', and 'v' may have the same definition as those of Equations 2 through 4.

The method described in the foregoing may be applied when only a composite image with a single view is provided, as well as when a multi-view composite image is provided. In a case of a multi-view composite image, $I_{VD}$ and $I_{VI}$ may be separated from an IR intensity image observed with multiple views. In an embodiment, both the depth image and the IR intensity image may be used such as by using a set of IR intensity image pairs and depth image pairs, for example. Equation 5 may then be optimized based on the set of IR intensity image pairs and depth image pairs. However, when only a single-view composite is used, a method described below may be applied. First, an orientation n may be calculated using a differential value of a depth image, and the result may be applied to Equation 5 as a default value. Subsequently, model constants p, α, $\rho_s$, and $\rho_d$ may be calculated using an optimization calculation method.

Figure 12A:
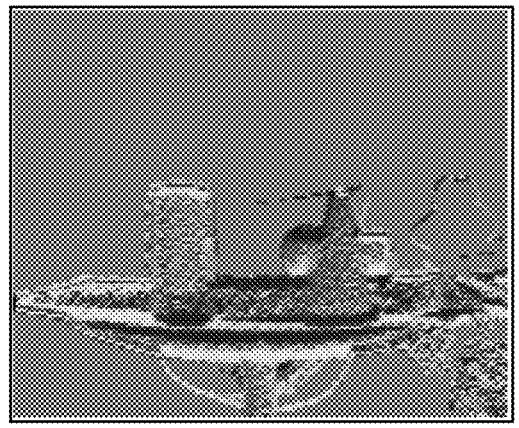
FIGS. 12A and 12B are orientation maps with reduced noise using a constraint extracted from a specular model according to an example embodiment.
Figure 12B:
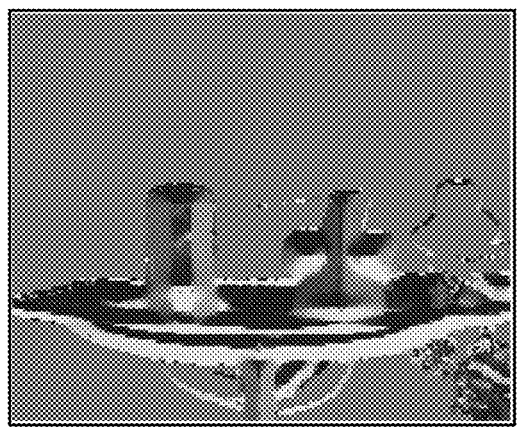

FIGS. 12A and 12B are orientation maps with reduced noise using a constraint extracted from a specular model according to an example embodiment. According to an example embodiment, accuracy of an orientation map may be improved by applying a constraint to an equation, the constraint indicating a phenomenon that an IR image follows a specular model of light. The orientation map may refer to a component being in proportion to a differential value of a depth map, and may correspond to a measurement value very sensitive to accuracy of geometry. Accordingly, accuracy of the orientation map may reflect accuracy of a depth image directly.

FIG. 12A illustrates an orientation map with sparkle noise caused by a measurement error and noise, making a surface look glossy, and FIG. 12B illustrates an orientation map robust against noise using an IR image and a specular model of light.

Figure 13A:
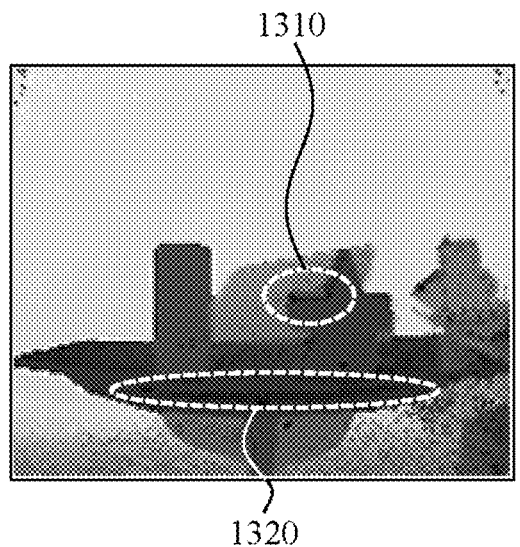
FIGS. 13A and 13B are depth maps with reduced error according to orientation and reflection using a specular model according to an example embodiment.
Figure 13B:
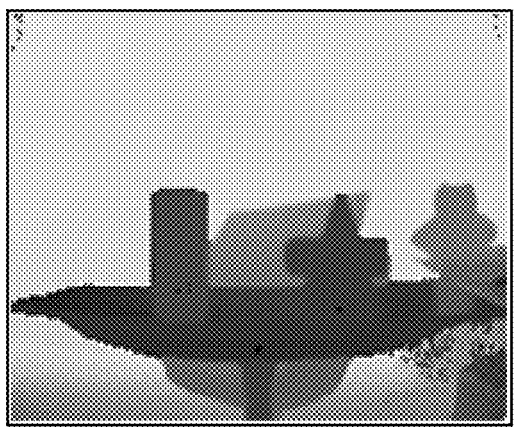

FIGS. 13A and 13B are depth maps with reduced error according to orientation and reflection using a specular model according to an example embodiment. According to an example embodiment, performance of an orientation map may be improved by applying a constraint to an equation, the constraint indicating a phenomenon that an IR image follows a specular model of light.

FIG. 13A illustrates an original depth map for an object with off-face orientation and an object exhibiting high reflection. The off-face orientation may refer to an angle between a surface orientation of the object and a view vector of a camera being distant from a horizontal line. Noise 1310 looking dark due to depth value loss caused by off-face orientation, and noise 1320 appearing to be dark due to depth value loss caused by high reflection may occur, resulting in a depth error. FIG. 13B illustrates a robust depth map using an IR image and a specular model of light.

Figure 14:
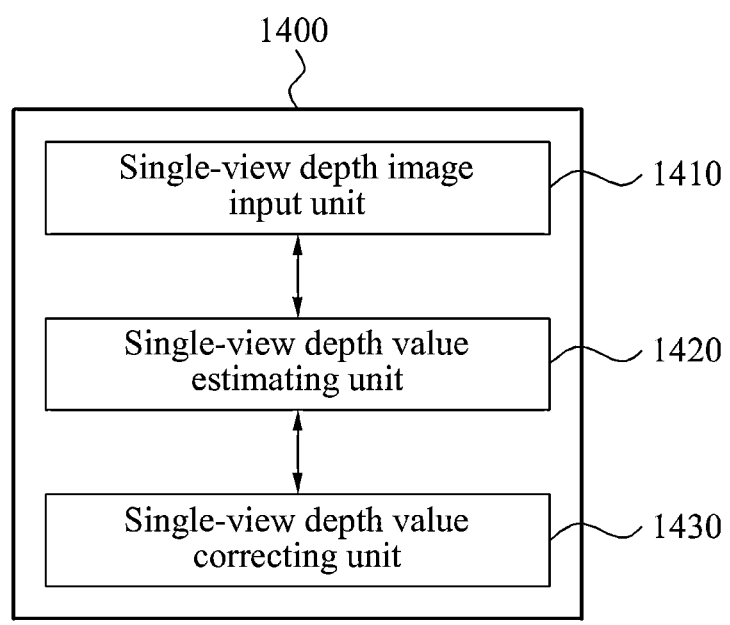
FIG. 14 illustrates an apparatus for acquiring geometry of a specular object based on a single-view depth image according to an example embodiment.

FIG. 14 illustrates an apparatus 1400 for acquiring geometry of a specular object based on a single-view depth image according to an example embodiment. The apparatus 1400 may include a single-view depth image input unit 1410, a single-view depth value estimating unit 1420, and a single-view depth value correcting unit 1430.

The single-view depth image input unit 1410 may receive an input of a depth image. According to an example embodiment, the single-view depth image input unit 1410 may include a depth camera and a depth sensor. Here, the depth image may include an IR image.

The single-view depth value estimating unit 1420 may estimate a missing depth value based on connectivity with a neighboring value in a local area of the depth image. According to an example embodiment, connectivity may be ensured by optimizing three cost functions for continuity, periodicity, and similarity of a depth value. The single-view depth value estimating unit 1420 may include a single-view depth value determining unit to determine the missing depth value by minimizing all the cost functions through adjusting weight values α, β, and γ in Equation 1. This process may be performed iteratively by a processor for each missing depth data to be recovered.

The single-view depth value correcting unit 1430 may correct the missing depth value. According to an example embodiment, the processor may replace the missing depth value with the depth value estimated by the single-view depth value estimating unit 1420. Accordingly, geometric information of the specular object may be extracted from the single-view depth image.

Figure 15:
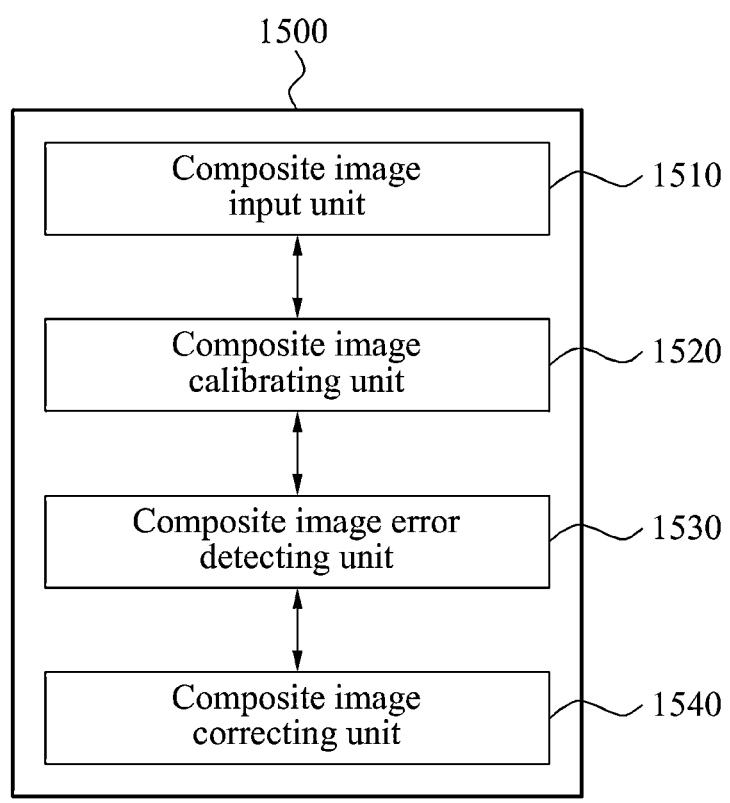
FIG. 15 illustrates an apparatus for acquiring geometry of a specular object based on a composite image according to an example embodiment.

FIG. 15 illustrates an apparatus 1500 for acquiring geometry of a specular object based on a composite image according to an example embodiment. The apparatus 1500 may include a composite image input unit 1510, a composite image calibrating unit 1520, a composite image error detecting unit 1530, and a composite image correcting unit 1540.

The composite image input unit 1510 may receive an input of a composite image with M views. According to an example embodiment, the composite image may include a depth image and an IR intensity image provided using ToF. Here, the composite image input unit 1510 may include, for example, a depth camera and a depth sensor.

The composite image calibrating unit 1520 may calibrate the composite image with M views using camera calibration. The camera calibration may refer to an optimization stage for capturing an object effectively by changing a location or angle of the camera. According to an example embodiment, openCV or Zhang's calibration toolbox may be applied through a processor. More particularly, the openCV may support camera calibration using chessboard corner information extracted from each of images for a target with a chessboard pattern.

The composite image error detecting unit 1530 may detect an error area in the composite image. According to an example embodiment, a distribution may be calculated by a processor using a K-means clustering algorithm or Gaussian mixture model fitting, and a 3D point at which multiple peaks are found in the distribution may be detected to be an error area.

The composite image error detecting unit 1530 may include a composite image distribution calculating unit to calculate a distribution of M number of depth values of a 3D point and M number of depth values observed from a neighboring 3D point of the corresponding 3D point in the composite image.

The composite image correcting unit 1540 may include a main cluster determining unit to determine a main cluster in the distribution, and a composite value determining unit to determine the missing depth value of the 3D point using an arbitrary value, an average, a weighted sum, or a median of samples in the main cluster, and may correct the composite image by replacing the missing depth value with the depth value determined by the processor. Accordingly, geometric information of the specular object may be extracted from the composite image.

According to another example embodiment, the composite image correcting unit 1540 may include a pixel separating unit to separate a view-independent pixel and a view-dependent pixel from the composite image, and a specular mode applying unit to apply different specular models to the view-independent pixel and the view-dependent pixel through the processor.

According to the example embodiments, applications may extend to light extraction technologies along with the use of a color image by acquiring orientation and reflection components using a specular model. The specular model may allow accurate geometry acquisition for a specular object by correcting an error hindering accuracy that may occur in a value measured by a depth sensor.

The methods according to the above-described embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard discs, floppy discs, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa. Any one or more of the software modules described herein may be executed by a controller such as a dedicated processor unique to that unit or by a processor common to one or more of the modules. The described methods may be executed on a general purpose computer or processor or may be executed on a particular machine such as the apparatusses described herein.

In the preceding disclosure, expressions such as "at least one of," when preceding a list of elements, may be interpreted as modifying or referring to the entire list of elements following the expression. Although embodiments have been shown and described, it would be appreciated by those skilled in the art that changes may be made in these embodiments without departing from the principles and spirit of the disclosure, the scope of which is defined by the claims and their equivalents.

What is claimed is:

1. A method of acquiring geometry of a specular object, the method comprising: receiving an input of a composite image including at least one of a depth image and an infrared (IR) intensity image; calibrating the composite image; detecting an error area in the calibrated composite image; and correcting a missing depth value of the error area based on the calibrated composite image.

2. The method of claim 1, wherein the correcting of the missing depth value of the error area comprises:
   separating a view-dependent pixel and a view-independent pixel from the composite image, and representing the composite image as a sum of the view-dependent pixel and the view-independent pixel; and
   applying different specular models to the view-dependent pixel and the view-independent pixel.

3. The method of claim 1, wherein the calibrating of the composite image comprises performing camera calibration by matching feature points extracted from a grid pattern.

4. The method of claim 1, wherein the composite image corresponds to an image with M views, wherein M is a natural number greater than or equal to two, and the detecting of the error area in the calibrated composite image comprises calculating a distribution of M number of depth values of a three-dimensional (3D) point in the composite image.

5. The method of claim 4, wherein the calculating of the distribution of M number of depth values of the 3D point in the composite image comprises calculating a distribution of M number of depth values observed from a neighboring 3D point of the 3D point.

6. The method of claim 4, wherein the detecting of the error area in the calibrated composite image comprises detecting a 3D point in which multiple peaks are found in the distribution and determining the 3D point to be the error area.

7. The method of claim 4, wherein the distribution is calculated through a K-means clustering algorithm or Gaussian mixture model fitting, and the correcting of the missing depth value of the error area comprises:
   determining a main cluster from a plurality of clusters in the K-means clustering algorithm or the Gaussian mixture model fitting;
   determining a depth value of the 3D point using an arbitrary value, an average, a weighted sum, or a median of samples in the main cluster; and
   replacing the missing depth value with the determined depth value.

8. The method of claim 7, wherein the determining of the main cluster from the plurality of clusters in the K-means clustering algorithm or the Gaussian mixture model fitting comprises determining a cluster having a greatest number of samples and a smallest variation among the plurality of clusters to be the main cluster.

9. A method of acquiring geometry of a specular object, the method comprising:
   receiving, by a processor, an input of a depth image;
   estimating, by the processor, a missing depth value based on connectivity with a neighboring value in the depth image; and
   correcting, by the processor, the missing depth value based on the estimating.

10. The method of claim 9, wherein the depth image includes a local area defined to be an area where a point including the missing depth value is centered.

11. The method of claim 9, wherein the depth image corresponds to a depth image having an output value at saturation level.

12. The method of claim 10, wherein the estimating of the missing depth value based on connectivity with the neighboring value in the depth image comprises estimating the missing depth value to ensure similarity of the missing depth value to an average value of the local area.

13. The method of claim 9, wherein the estimating of the missing depth value comprises estimating the missing depth value to ensure continuity of the missing depth value with respect to a neighboring pixel.

14. The method of claim 9, wherein the estimating of the missing depth value comprises estimating the missing depth value to ensure periodicity of a pattern in the depth image.

15. The method of claim 10, wherein the estimating of the missing depth value comprises:
   estimating the missing depth value to ensure similarity of the missing depth value to an average value of the local area, continuity with respect to a neighboring pixel, and periodicity of a pattern in the depth image; and
   applying weight values to the similarity, the continuity, and the periodicity, and determining the missing depth value using a lowest total cost.

16. An apparatus for acquiring geometry of a specular object, the apparatus comprising: a composite image input unit configured to receive an input of a composite image including at least one of a depth image and an infrared (R) intensity image; a composite image calibrating unit configured to calibrate the composite image; a composite image error detecting unit configured to detect an error area in the calibrated composite image; and a composite image correcting unit configured to correct a missing depth value of the error area based on the calibrated composite image.

17. The apparatus of claim 16, wherein the composite image corresponds to an image with M views, wherein M is a natural number greater than or equal to two, and the composite image error detecting unit comprises a composite image distribution calculating unit configured to calculate a distribution of M number of depth values of a 3D point in the composite image and M number of depth values observed from a neighboring 3D point of the 3D point.

18. The apparatus of claim 17, wherein the composite image distribution calculating unit is configured to calculate the distribution through a K-means clustering algorithm or Gaussian mixture model fitting, and the composite image correcting unit comprises:
   a main cluster determining unit configured to determine a cluster having a greatest number of samples inside and a smallest variation among the plurality of clusters to be a main cluster among a plurality of clusters in the K-means clustering algorithm or the Gaussian mixture model fitting;
   a composite value determining unit configured to determine a depth value of the 3D point using an arbitrary value, an average, a weighted sum, or a median of samples in the main cluster; and
   a composite value replacing unit configured to replace the missing depth value with the determined depth value.

19. An apparatus for acquiring geometry of a specular object, the apparatus comprising:
   a processor including,
      a single-view depth image input unit configured to receive an input of a depth image,
      a single-view depth value estimating unit configured to estimate a missing depth value based on connectivity with a neighboring value in a local area of the depth image, and
      a single-view depth value correcting unit configured to correct the missing depth value based on the estimating of the single-view depth value estimating unit.

20. The apparatus of claim 19, wherein the single-view depth value estimating unit is configured to estimate the missing depth value to ensure similarity of the missing depth value to an average value of the local area, continuity with respect to a neighboring pixel, and periodicity for a pattern in the depth image, and
   wherein the processor further comprises a single-view depth value determining unit configured to apply weight values to the similarity, the continuity, and the periodicity and to determine the missing depth value using a lowest total cost.

21. A 3D depth sensing camera comprising:
   a processor to control one or more processor-executable units including,
      a depth value estimating unit to determine a depth value to be replaced in a depth image, and
      a depth value correcting unit to replace the depth value with a value obtained based on a neighboring depth value.

22. A method of acquiring geometry of a specular object, the method comprising: receiving an input of a composite image including at least one of a depth image and an infrared (IR) intensity image having multiple views; calibrating the composite image by matching feature points of the multiple views; detecting an error area in the calibrated composite image; and correcting a missing depth value of the error area using a depth value obtained from a view of a point corresponding to the error area that is determined based on the calibrated composite image.

23. A non-transitory medium comprising computer readable code to control at least one processor to implement the method of claim 22.

24. An apparatus reconstructing a depth value in a composite image, the apparatus comprising: a processor to control one or more processor-executable units, the one or more processor-executable units including, a composite image calibrating unit to calibrate the composite imager a composite image error detecting unit to detect a depth value to be replaced in a view based on the calibrated composite image, a composite image measuring unit to measure depth values of points, each point corresponding to the depth value to be replaced, in different views of the composite image, and a composite image error correcting unit to correct the depth value to be replaced based on the depth values of the points measured by the composite image measuring unit.

* * * * *